Nov. 21, 1933.  R. R. SEARLES  1,935,957
SPRING CONNECTION
Filed April 13, 1929
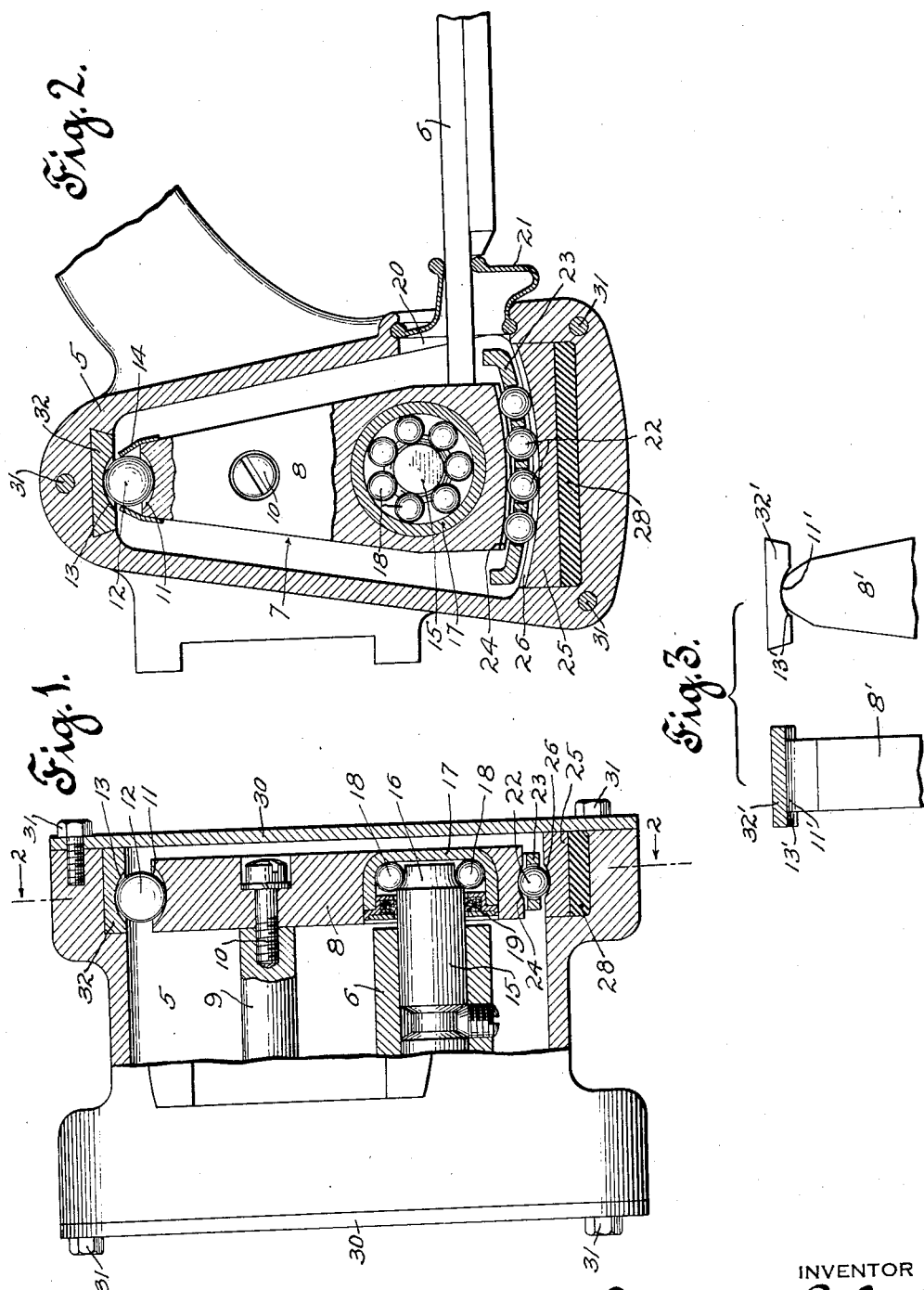
INVENTOR
Raymond R. Searles
BY
Mitchell Bulut
ATTORNEYS.

Patented Nov. 21, 1933

1,935,957

UNITED STATES PATENT OFFICE 1,935,957

SPRING CONNECTION

Raymond R. Searles, New Britain, Conn., assignor to The Fafnir Bearing Company, New Britain, Conn., a corporation of Connecticut Application April 13, 1929. Serial No. 354,718

16 Claims. (Cl. 267—54)

My invention relates to a spring end connection for connecting the frame and spring of a motor vehicle.

It is an object of the invention to provide an improved antifriction bearing spring end connection in which all working parts may be effectively closed in to prevent access of dust and water and to retain lubricant where required.

It is another object to provide an improved antifriction spring end connection, simple in construction, cheap to manufacture, and effective in operation.

Other objects and features of invention will appear as the specification proceeds.

In the drawing which shows, for illustrative purposes only, preferred forms of the invention—

Fig. 1 is an end view in partial section of a spring end connection embodying the invention;

Fig. 2 is a sectional view taken substantially in the plane of the line 2—2 of Fig. 1;

Fig. 3 illustrates a sectional and side view of a slight modification.

A spring and frame are connected together by means of my improved connection, and all working parts are preferably effectively housed so as to prevent the access of dust and water and to retain lubricant. One of the members to be connected (in this case the frame) is provided with a housing 5, while the other member (in this case the spring 6) is operatively connected to the frame by means to be described.

The housing 5 may be generally triangular in cross-section and provides two abutments for the proper accommodation between them of the oscillating link means 7, which forms one of the connecting members of my improved construction. The link means 7 at one end has a rocking connection with one abutment within the housing and a sliding connection with the other abutment. The spring is pivotally connected to the link preferably by an antifriction bearing near the sliding end of said link. If desired, the link may be urged and held in operative position by antifriction bearing means and resilient means for urging the link into operative position.

In the form shown in Figs. 1 and 2, the link means 7 is composed of two links as 8, one only being shown in the section views since the other link may be and preferably is a duplicate of that shown. The two links as 8 may be definitely spaced apart and connected as by means of a spacer 9 rigidly secured to both links by means of screws 10 or the like. Each link may be provided at one end (in this case the upper end) with a curved bearing seat 11 for the reception of an antifriction bearing member such as a ball 12. The housing is provided with spaced apart curved bearing seats or abutments as 13 complementary to those on the link members 8—8. The ball 12 interposed between the seats 11—13 of each link and the housing may be held to one of the members, for example the link, by means of a suitable ball retainer 14.

The spring 6 is pivotally connected to each link 8 preferably through an antifriction bearing. In the form shown, the end of the spring 6 carries a pin 15 rigidly secured thereon and having an antifriction raceway 16 either formed directly on the ends thereof or on separate members carried at the ends. Outer or complementary bearing rings as 17 are carried by the links 8—8 and antifriction bearing members, such as balls 18, are interposed between the seats 16—17. A retaining washer or what may be termed a dust ring 19 may be employed for closing the space between the cup ring 17 and the ends of the pin 15. The relatively large opening 20 in the housing for the passage of the spring 6 may be closed by a boot 21 or the like so as to prevent access of dust and water through such opening 20. The action of the construction thus far disclosed is as follows:

When the spring flexes, the pin 15 rotates or oscillates slightly on the balls 18 and the links 8 rock back and forth within the housing. During this oscillation the links rock on the bearing members 12—12. When the rocking members such as 12 are balls, slight side movement of the links may be permitted so that the links may move back and forth sidewise to a limited extent as well as rock on the balls. During the rocking of the links 8—8 there may be a slight sliding action of the balls 12—12 on their respective seats, but since the oscillation of the links is quite limited, but slight wear will occur, and since such surfaces may be very effectively lubricated, there should be substantially no squeaks.

With the connection arranged as shown, the weight of the vehicle acting through the frame 5 is downwardly so that the normal tendency is for the links 8—8 to remain in the operative position shown. However, on a severe rebound, it is possible that the links might be moved downwardly sufficiently so as to cause a disengagement of the balls 12 from their seats. In order to hold the links 8—8 in the operative position shown, I may employ antifriction bearings such as balls 22 held in a retainer 23. The lower end of each link 8 may be provided with a proper grooved seat 24 for receiving the balls 22. The lower part of the housing forms a second abutment and this may be provided with a separate seat block 25 having a seat 26 complementary to the seat 24 at the lower end of the link, as will be clear from the drawing. The seats 24—26 in transverse section, as shown in Fig. 2, are concentric with the axis of oscillation of the links 8—8 so that regardless of the position of oscillation of the links the bearing members 22 will be substantially in contact with both seats. The presence of the members 22—22 in the seats limits lateral displacement of the links 8—8 in the housing as will also the side walls of the grooves in which the elements 12—12 are located. If desired, the abutment seat block 25 may be urged upwardly by resilient means such as a rubber pad 28 interposed between the bottom of the housing and the seat block 25. Thus, all parts of the connection are maintained in operative position.

The outer side ends of the housing 5 may be closed by side cover plates 30—30 secured as by means of screws 31—31 so as to complete the enclosure of the housing, and these closure plates may in turn be employed for maintaining the separate seat blocks 32, 25 and 28 in place when these separate blocks are employed.

In that form of the invention shown in Fig. 3, the rocking connection between the links 8' and the housing or seat blocks 32' may be made without the interposition of balls or the like. As shown in Fig. 3, the seat block 32' is provided with a curved concave bearing seat 13', while the upper end of the link is provided with a convex bearing seat 11' preferably of a lesser radius of curvature than the seat 13'. The construction shown in Fig. 3 may at times suffice, but greater freedom of action may be had with an interposed ball such as 12 or other antifriction bearing members.

It will be seen that by means of my improved spring end connection, all working parts are completely housed so as to prevent access of dust and water and the retention of lubricant, and the construction may be readily assembled and disassembled. During use, the parts will operate quietly and the connection will require little or no attention. If desired, the entire housing may be substantially filled with lubricant and due to the relatively slight motion of the various parts but little lubricant will be used up, and additional lubricant will be required at very infrequent intervals.

While the invention has been described in considerable detail and preferred forms illustrated, I do not wish to be strictly limited to the illustrated embodiments since changes, omissions, and additions may be made within the scope of the invention as defined in the appended claims.

I claim:

1. In a spring end connection, a housing to be connected to a frame, an oscillatory link within said housing, an antifriction bearing member interposed between the upper end of said link and said housing to permit a rocking of said link, and means including an antifriction bearing for connecting a spring to the opposite end of said link for the purpose described.

2. In a spring end connection, a housing to be secured to a frame, an oscillatory link within said housing, one end of said link having a rocking connection within said housing, means for pivotally securing a spring to the opposite end of said link, and means at the end of said link opposite said rocking connection for maintaining the parts of said rocking connection in engagement with each other.

3. In a spring end connection, a housing to be secured to a frame, an oscillatory link within said housing, one end of said link having a rocking connection with said housing, means for pivotally connecting the opposite end of said link with a spring, and resilient means for maintaining said link in operative position within said housing.

4. In a spring end connection, a housing to be secured to a frame, said housing having a curved bearing seat in the upper end thereof, an oscillatory link within said housing and having a complementary curved bearing seat in the upper end thereof, an antifriction bearing member interposed between the complementary curved seats in said housing and said link, and means including an antifriction bearing for securing a spring to the opposite end of said link.

5. In a spring end connection, a housing to be secured to a frame, an oscillatory link within said housing, an antifriction bearing member between said link and housing, means including an antifriction bearing for connecting a spring to said link, and means including an antifriction bearing for maintaining said link in operative position in said housing.

6. In a spring end connection, a housing to be secured to a frame, an oscillatory link within said housing, said link having a rocking connection at one end with said housing, means for pivotally connecting a spring to the opposite end of said link, and means including an antifriction bearing for maintaining said link in operative position within said housing.

7. In a spring end connection, a housing to be secured to a frame, an oscillatory link within said housing, said link having a rocking connection at one end with said housing, means for pivotally connecting a spring to said link, and resilient means for maintaining said link in operative position in said housing.

8. In a spring end connection, a housing to be secured to a frame, said housing having spaced apart curved bearing seats in the upper end thereof, a pair of links rigidly secured together in spaced relation, said links having curved seats complementary to said curved seats in said housing, and antifriction bearing means for pivotally connecting a spring to said links.

9. In a spring end connection, a housing having spaced apart curved seats at one end thereof, link means within said housing and having curved seats complementary to said seats in said housing, antifriction bearing means for pivotally connecting a spring to said link, and means for maintaining said link means in operative position within said housing.

10. In a spring end connection, a housing to be secured to a frame, said housing having spaced apart curved seats at one end thereof, link means within said housing and having seats complementary to said seats in said housing, antifriction bearing members interposed between said seats in said housing and on said link means, antifriction bearing means for pivotally connecting the spring to said link, and antifriction bearing means for maintaining said link means in operative position within said housing.

11. In a spring end connection, a housing to be secured to a frame, an oscillatory link within said housing, said link having a rocking connection at one end with said housing, means for pivotally connecting a spring to the opposite end of said link, antifriction bearing means for maintaining said link in operative position within said housing, and resilient means for urging said last mentioned antifriction bearing means in one direction.

12. In a spring connection, a frame member, a spring member, a link rockably seated at one extreme end against said frame, and bearing means connecting said link to said spring member, and means to prevent the unseating of said link from said frame.

13. In a spring connection, a frame member, a spring member, a link rockably connected at one end to said frame member and slidably connected at the other end to said frame member resilient means for maintaining the connection between said link and frame, and a bearing connection between the ends of said link for said spring member.

14. A spring connector comprising two spaced abutments, a device in said space, said device being mounted at one end to rock relatively to one of said abutments and to slide relatively to the other abutment, and a spring bearing between the ends of said device.

15. A spring connector comprising two spaced abutments, a device in said space, said device being mounted at one end to rock relatively to one of said abutments and to slide relatively to the other abutment, a spring bearing between the ends of said device, and means to limit the lateral movement of said device relatively to said abutments.

16. A spring connector comprising a mounting including two rigidly spaced abutments, a link held between said abutments and oscillating with relation to one and sliding to and fro with relation to the other, and means for connecting a spring to said link between the ends of the latter.

RAYMOND R. SEARLES.